2 Sheets—Sheet 1.
M. C. FRANKLIN & N. LANDRUM.
Brake for Wagons and Cars.
No. 216,842. Patented June 24, 1879.
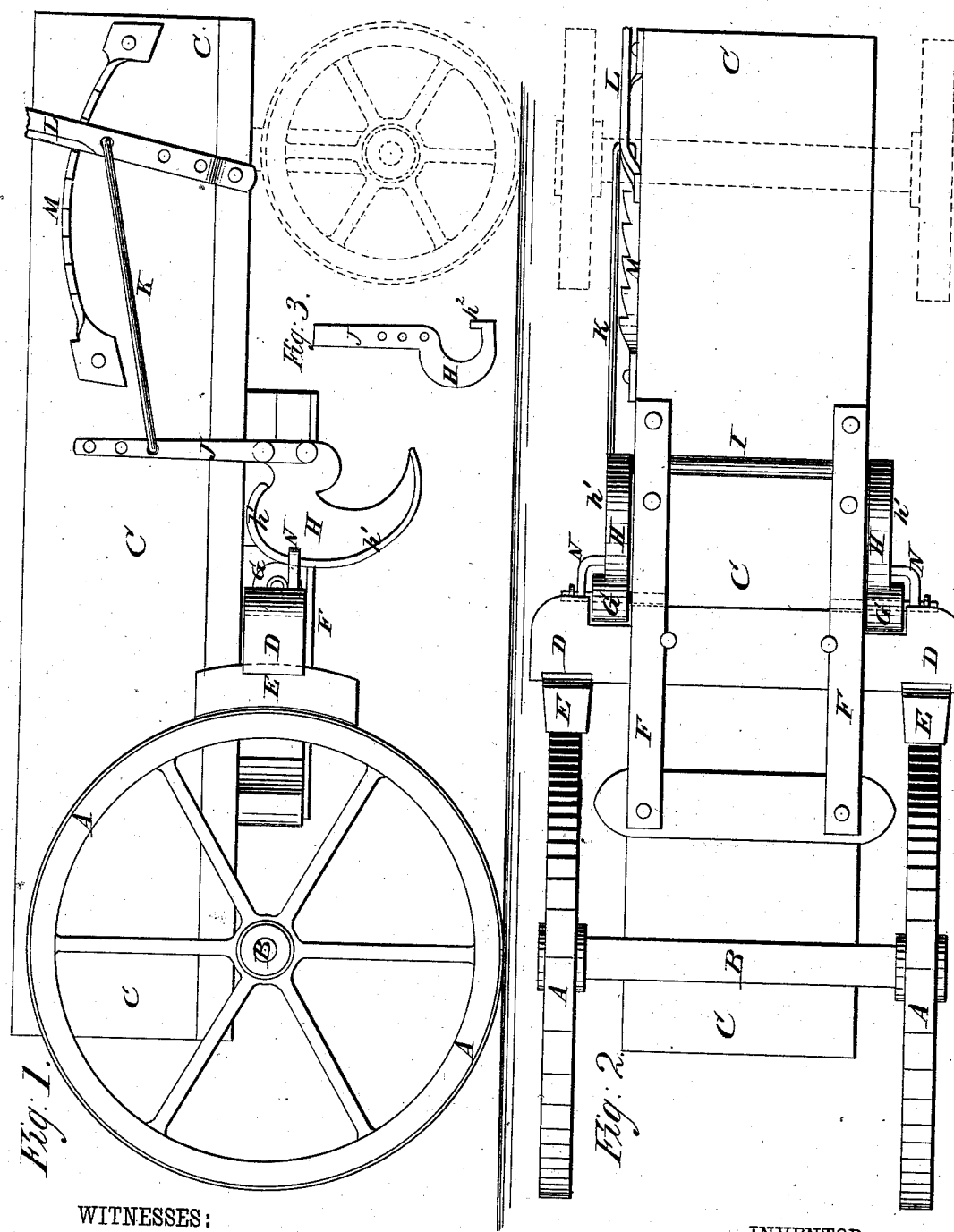
WITNESSES:
Achilles Schehl.
C. Sedgwick
INVENTOR:
M. C. Franklin
N. Landrum
BY Munn & Co
ATTORNEYS.

2 Sheets—Sheet 2.
M. C. FRANKLIN & N. LANDRUM.
Brake for Wagons and Cars.
No. 216,842. Patented June 24, 1879.
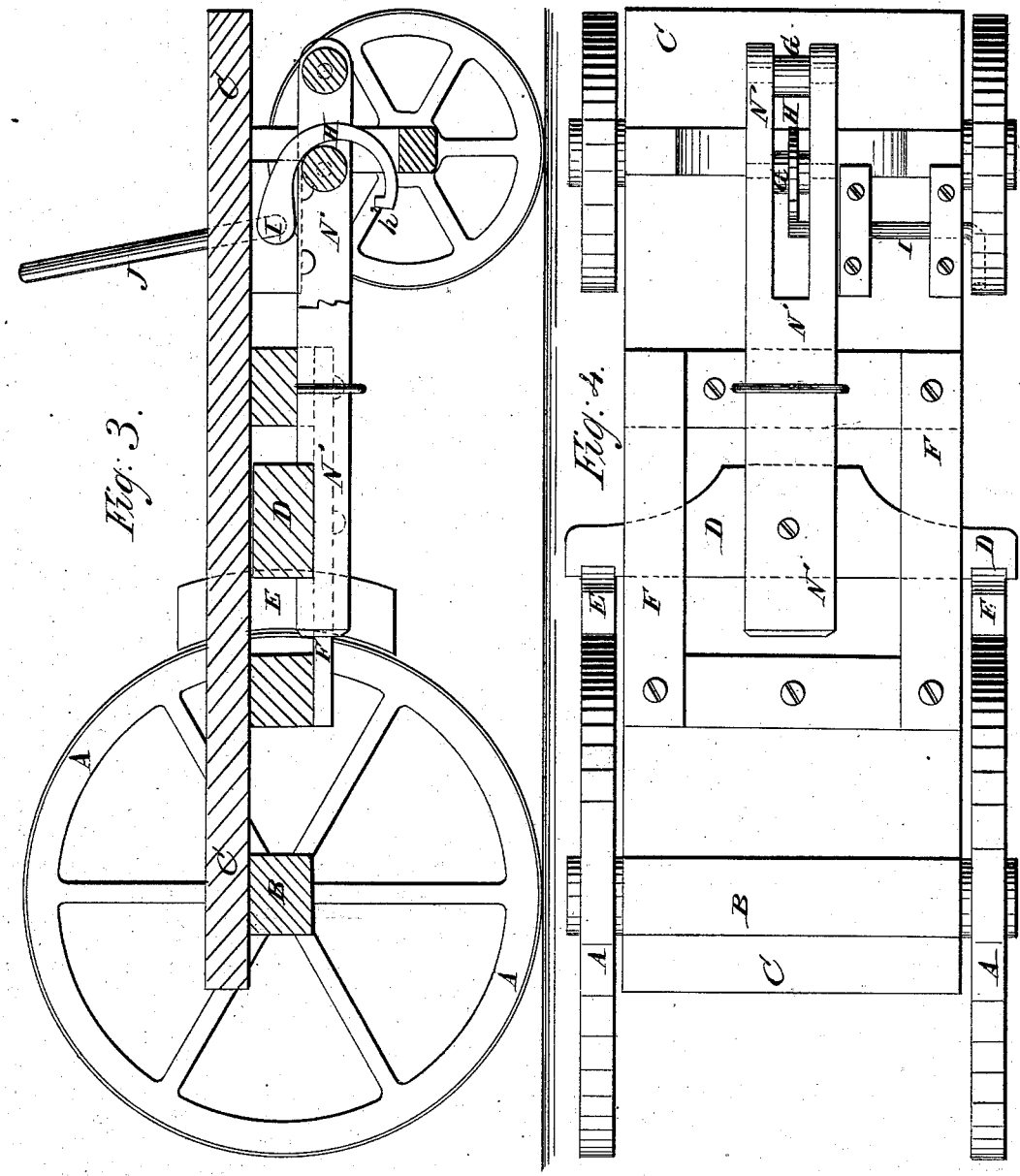
WITNESSES:
Achilles Schehl.
C. Sedgwick
INVENTOR:
M. C. Franklin
N. Landrum
BY
ATTORNEYS.

UNITED STATES PATENT OFFICE.

MATHEW C. FRANKLIN AND NATHANIEL LANDRUM, OF PRAIRIE LEA, TEXAS.

IMPROVEMENT IN BRAKES FOR WAGONS AND CARS.

Specification forming part of Letters Patent No. 216,842, dated June 24, 1879; application filed April 9, 1879.

*To all whom it may concern:*

Be it known that we, MATHEW C. FRANKLIN and NATHANIEL LANDRUM, of Prairie Lea, in the county of Caldwell and State of Texas, have invented a new and useful Improvement in Wagon and Car Brakes, of which the following is a specification.

Figure 1, Sheet 1, is a side view of our improved brake, shown as applied to a wagon. Fig. 2, Sheet 1, is a bottom view of the same. Fig. 3, Sheet 1, shows a modification of the lever-cam. Fig. 4, Sheet 2, is a section of a wagon, showing a modification of the brake. Fig. 5, Sheet 2, is an under-side view of the same.

Similar letters of reference indicate corresponding parts.

The object of this invention is to furnish an improved brake for wagons, cars, and other vehicles which shall be simple in construction, convenient in use, and powerful in operation.

The invention consists in combining with a brake-bar, notched, having hooks, and sliding in keepers on wagon-body, two small rolls, pivoted in said notches, the cams having flanges, the shaft and the levers connected by rod, as hereinafter described.

A represents the rear wheels, B the rear axle, and C the body, of a wagon to which our improvement has been applied.

D is the brake-bar, to the ends of which the brake-shoes E are attached, and which slides in keepers F, attached to the body or gearing of the wagon.

In notches or recesses in the forward edge of the brake-bar D are pivoted two small rollers, G, against which rest the faces of two cams, H, attached to the ends of a shaft, I. The shaft I works in bearings attached to the body C, and to it, or to one of the cams H, is attached the lever J, which passes up at the side of the body C.

To the upper part of the lever J is pivoted the rear end of a connecting-rod, K, the forward end of which is pivoted to the lever L. Several holes are formed in the levers J L, to receive the ends of the rod K, so that the leverage may be adjusted as may be required.

The lever L is pivoted at its lower end to the lower part of the body C, and its upper end extends up into such a position that it may be conveniently reached and operated by the driver.

The lever L is held in any position into which it may be adjusted by a notched catch-bar, M, attached to the side of the body C, and along which the said lever L moves.

Upon the outer sides of the cams H, and along their curved edges, are formed flanges $h^1$, around which hook the hooks N, attached to the brake-bar D, so that the brake may be applied and withdrawn with a positive movement by moving the lever L forward and back.

In the modification shown in Fig. 3, and which is especially designed for cars, the rollers of the brake-bar D roll along the inner edge of the cam H, so that when the lever J is drawn back the roller may move toward the center, and thus allow any desired amount of power to be applied.

At the lower end of the cam H is formed a shoulder or offset, $h^2$, for the roller to rest upon when not in use.

If desired, a bar, N', may be attached at its rear end to the center of the brake-bar D. The forward part of the bar N' is slotted, and to it, within the said slot, are pivoted two rollers, G, at such a distance apart as to receive the cam H between them, so that the brake may be applied by the pressure of the concave edge of the said cam against the rear roller, and withdrawn by the pressure of its convex edge against the forward roller G.

In this case the cam H is placed beneath the middle part of the body C, and the lever J extends up at the side of the said body.

Having thus described our invention, we claim as new and desire to secure by Letters Patent—

The combination, with brake-bars, notched, having hooks N, and sliding in keepers F, of two small rolls, pivoted in said notches, the cams H, having flanges $h^1$, the shaft I, and the levers J L, connected by rod K, as shown and described.

MATHEW CALHOUN FRANKLIN.
NATHANIEL LANDRUM.

Witnesses:
 W. B. WALKER,
 W. N. MCKINNEY.